Aug. 27, 1957 — H. E. SCHALLER — 2,804,112
KNIFE ASSEMBLY FOR MEAT CUTTING MACHINES
Filed Dec. 31, 1953

INVENTOR.
Harold E. Schaller
BY
ATTORNEY

United States Patent Office 2,804,112
Patented Aug. 27, 1957

2,804,112

KNIFE ASSEMBLY FOR MEAT CUTTING MACHINES

Harold E. Schaller, Buffalo, N. Y.

Application December 31, 1953, Serial No. 401,458

3 Claims. (Cl. 146—106)

This invention relates to certain new and useful improvements in the revolving knife blade unit or assembly employed in connection with meat cutting machines used in the meat packing industry.

It has for one of its objects to provide a knife blade unit of this character which is so designed and constructed as to effectually and positively retain the blades against accidental displacement during the cutting operation to afford maximum safety to the operator and which at the same time permits the parts to be readily assembled or disassembled for replacement or reversal of the blades.

Another object of the invention is to provide simple and inexpensive means for individually mounting the knife-blades in definite relative positions about the axis of the revolving spindle and for effecting their proper adjustment in relation to the meat bowl.

Other features of the invention reside in the construction and arrangement of parts hereinafter described and particularly pointed out in the appended claims.

In the accompanying drawings.

Similar characters of reference indicate corresponding parts throughout the several views.

Figure 1:
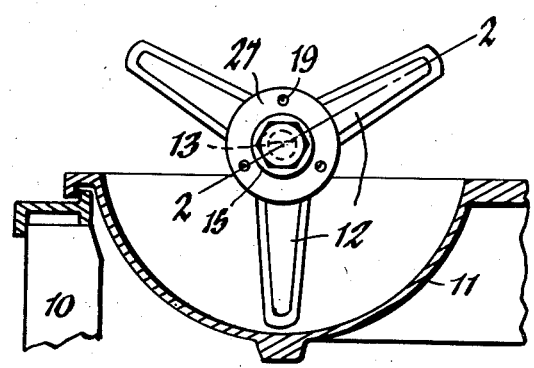
Figure 1 is a fragmentary cross section of a meat cutting machine equipped with my improved knife assembly in an end view position.
Figure 2:
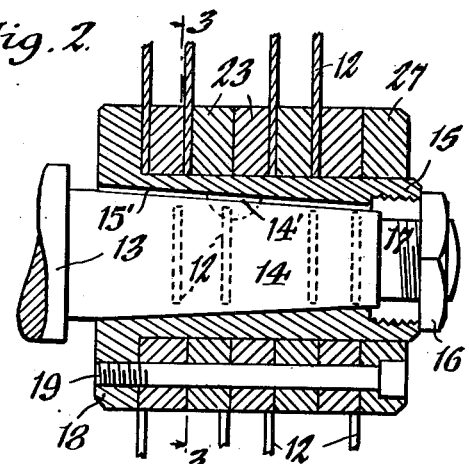
Figure 2 is an enlarged fragmentary sectional side elevation of such assembly, the section being taken generally on line 2—2, Figure 1.
Figure 3:
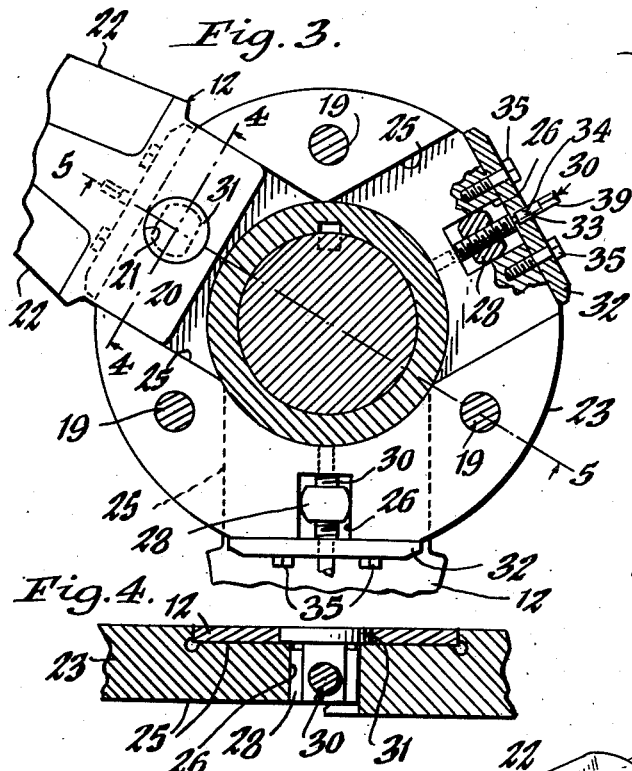
Figure 3 is a still further enlarged cross section taken on line 3—3, Figure 2.
Figure 5:
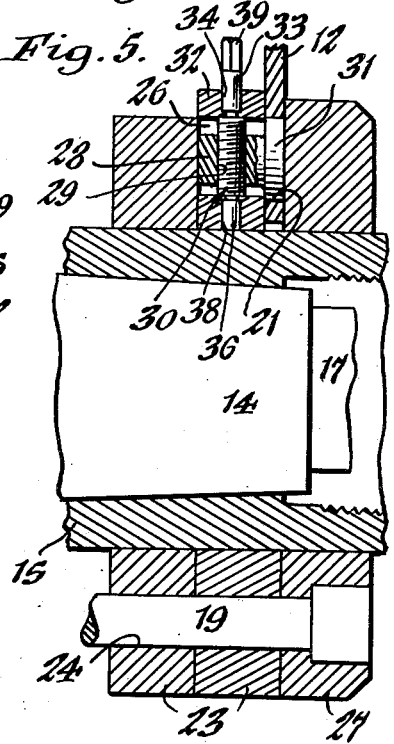
Figure 5 is a fragmentary section taken on line 5—5, Figure 3.
Figure 4:
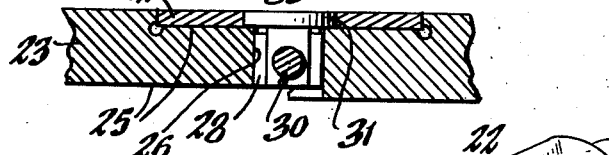
Figure 4 is a fragmentary cross section taken on line 4—4, Figure 3 and on the same scale as Figure 3.
Figure 6:
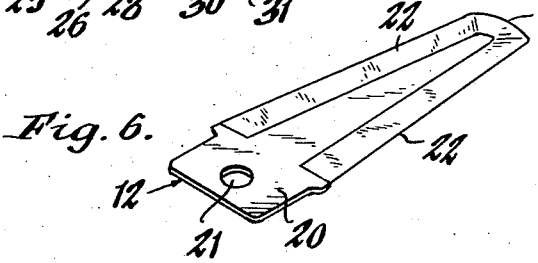
Figure 6 is a detached perspective view of one of the knives.

My improved knife assembly is particularly designed for use in connection with a revolving bowl type of meat cutting machine, and in Figure 1, 10 indicates the base frame of the machine, 11 the revolving bowl mounted thereon which is of the usual annular trough-like construction, and 12 indicates the knives or blades which rotate at a high speed within the bowl trough to cut the meat. This knife assembly is mounted on a transverse drive shaft or spindle 13 suitably journaled over the bowl at one side of its axis.

The knives are disposed side by side in axially-spaced sets and clamped as a unit or group at equi-spaced radial positions about the shaft 13, and are adapted to be individually adjusted to close tolerances and to be readily removed for easy cleaning or reversal of their cutting edges or for replacement when necessary. At one end the shaft has a tapered nose 14 on which a knife assembly sleeve 15 is keyed by a key 14' on the nose 14 extending into a keyway 15' in the bore of the sleeve 15, the latter being removably retained by a nut 16 applied to the threaded end 17 of such nose, while the opposite end of the sleeve has an annular flange 18 against which the inner end of the knife assembly abuts and to which it is detachably secured as a unit by attaching bolts 19. Each knife preferably consists of a straight, symmetrical bar-like blade including an inner attaching portion 20 having parallel side edges and an opening 21 disposed centrally thereof with its axis intersecting the longitudinal center line of the blade. The opposite side edges of the blade portion of the knife taper somewhat outwardly and are provided with cutting edges 22 thereon, while the transverse outer end thereof has a cutting edge 22a thereon in continuing adjoining relation to the side cutting edges. Removably mounted on the sleeve 15 and constituting spacers between the knives, as well as supports on which the knives are individually clamped and secured for radial adjustment, are a plurality of collars 23 having equi-spaced and registering transverse openings 24 therein through which the attaching bolts 19 extend to retain the collars with their knives as a unit on the sleeve.

In one or both faces thereof each collar 23 has one or more radially-grooved knife-engaging seats or recesses 25 therein which extend from the bore thereof to its outer periphery, and provided centrally of each seat is a radially-disposed notch or opening 26 of less width than the recess, the latter being of a width to receive the attaching portion 20 of a companion knife to effectually guide it for radial adjustment and retain it against circumferential displacement relative to the collar. The depth of each seat is approximately the same as the thickness of the attaching portion of the knife so that one face thereof bears against the finished bottom of the seat and the other face bears flushwise against the opposing finished face of the next adjoining collar to effectually clamp the blade against axial or thrustwise displacement but permit its sliding radially in such seat for adjustment purposes. In the example shown in the drawings, twelve knives are employed with three knives being mounted in equi-spaced radial relation on the two innermost collars, each such collar having two seats or recesses 25 in one face or plane thereof and one recess in the opposing face or plane thereof, while two knives are mounted on each of the remaining three collars, each of the latter having two such seats disposed at 120° apart and in the same plane. An end retaining collar 27 is provided which bears against the outermost recessed collar 23 with the heads of the attaching bolts 19 being recessed into abutting the outer face of the former.

Adjustably fitted for radial movement in each of the knife-registering, collar-openings or notches 26 is a knife retainer pin 28 having a threaded opening 29 therein through which an adjusting screw 30, mounted radially of the collar, extends and whereby such pin is adapted to be moved radially in or out. At its outer end this pin has a head 31 with which the opening 21 in the companion knife 12 is adapted to engage, said head being approximately the same thickness as the thickness of the knife and the knife-receiving recess 25 in the collar so that the pin-head is flush with the contiguous face of the collar and the knife. Each adjusting screw 30 is shown as having a reduced end 33 journalled in an opening 34 in a cross bar 32 connected by screws 35 to the peripheral edge of the companion collar 23 across the open end of its pin-receiving notch 26, while the opposite reduced end 36 of the screw is journalled in an opening 38 in the collar at the bottom of the companion notch 26. By turning the square end 39 of the screw in one direction or the other, the knife is accordingly moved radially inwardly or outwardly to adjust it in the desired position to the meat trough, it being understood that during such an adjusting operation the knife assembly attaching bolts 19 are relieved somewhat to free the collars 23 and, after the completion of the adjustment, turned firmly home to lock the assembly rigidly in place on the sleeve 15.

While manifestly simple, strong and compact in construction, this improved composite knife assembly employs a positive blade locking action while permitting individual adjustment and replacement of the knife-blades, it has a high cutting efficiency, the arrangement of the blades is such that the shock loads are distributed uniformly, and it affords maximum safety.

I claim as my invention:

1. In a meat cutter, a rotary shaft, a plurality of collars mounted on said shaft to turn therewith and having contiguous radial end faces and also having outwardly opening seats, in the contiguous faces thereof, said seats having parallel radially extending guide surfaces, a plurality of knife blades disposed among the collars and having inner ends fitted flushwise in companion seats thereof, said inner ends being provided with parallel guide surfaces slidingly mating with said parallel radially extending guide surfaces of said seats, and said inner ends being each also provided between their said parallel guide surfaces with a hole, a pin associated with each of said seats and having a stem extending generally parallel with the axis of said shaft and slidably fitted in a radially extending notch provided in each collar along each seat thereof and in line with said hole, a head fixed to one end of each stem and fitted in the companion hole of the corresponding knife blade whereby each pin and the companion knife blade are compelled to move radially in unison, and screw means operatively interposed between each pin and its collar and arranged to adjustably position said pin radially along its notch.

2. In a meat cutter, a rotary shaft, an attaching sleeve for a knife blade assembly mounted on said shaft to turn therewith and having an annular outwardly projecting flange at one end, a plurality of collars having contiguous guide faces mounted on said sleeve with the collar at one end abutting said flange, and said collars having outwardly opening seats in said contiguous faces thereof, said seats having parallel and radially extending surfaces, a plurality of knife blades disposed among the collars and having inner ends fitted flushwise in the companion seats thereof, said inner ends being provided with parallel guide surfaces slidingly mating with said parallel radially extending guide surfaces of said seats, means for individually anchoring each of said blades in its seat, and an annular series of attaching bolts arranged parallel with said shaft and extending through registering openings in said collars and having threaded ends screwing into threaded holes in said flange to hold said knife blades and collars in coupled relation with said sleeve.

3. In a meat cutter, a rotary shaft, an attaching sleeve for a knife blade assembly mounted on said shaft to turn therewith and having an annular outwardly projecting flange at one end, a plurality of collars having contiguous guide faces mounted on said sleeve with the collar at one end abutting said flange, and said collars having outwardly opening seats in said contiguous faces thereof, said seats having parallel and radially extending surfaces, a plurality of knife blades disposed among the collars and having inner ends fitted flushwise in the companion seats thereof, said inner ends being provided with parallel guide surfaces slidingly mating with said parallel radially extending guide surfaces of said seats, said inner ends of said knife blades being provided between their parallel guide surfaces with holes, a plurality of retainer pins carried by said collars and arranged parallel with the axis of said shaft and intersecting said seats with one end face of said pins being arranged substantially flush with the adjoining collar face, said pins extending through said holes in said inner ends of said knives to anchor said knives in said seats, and an annular series of attaching bolts arranged parallel with said shaft and extending through registering openings in said collars and having threaded ends screwing into threaded holes in said flange to hold said knife blades and collars in coupled relation with said sleeve.

References Cited in the file of this patent

UNITED STATES PATENTS

| | | |
|---|---|---|
| 750,329 | Windingstad | Jan. 9, 1904 |
| 1,261,954 | Newman | Apr. 9, 1918 |
| 1,720,468 | Combest | July 9, 1929 |
| 1,855,832 | Hind | Apr. 26, 1932 |
| 2,517,405 | Moss | Aug. 1, 1950 |
| 2,711,270 | Gulbrandsen | June 21, 1955 |